(12) United States Patent
Song

(10) Patent No.: US 8,782,862 B2
(45) Date of Patent: Jul. 22, 2014

(54) ASSEMBLY APPARATUS

(75) Inventor: Shang-Xuan Song, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 830 days.

(21) Appl. No.: 12/975,688

(22) Filed: Dec. 22, 2010

(65) Prior Publication Data

US 2012/0005872 A1   Jan. 12, 2012

(30) Foreign Application Priority Data

Jul. 12, 2010  (CN) .......................... 2010 1 0223941

(51) Int. Cl.
- *B23P 11/00* (2006.01)
- *B23P 19/04* (2006.01)
- *B21D 45/00* (2006.01)
- *B25B 27/14* (2006.01)

(52) U.S. Cl.
USPC ................................. 29/235; 29/240; 72/427

(58) Field of Classification Search
USPC .......................................................... 29/235
See application file for complete search history.

(56) References Cited

U.S. PATENT DOCUMENTS

| | | | | |
|---|---|---|---|---|
| 2,263,690 A | * | 11/1941 | Bradley | 29/235 |
| 2,609,777 A | * | 9/1952 | Maniaci | 72/427 |
| 3,263,318 A | * | 8/1966 | Merrill | 29/811.2 |
| 4,013,281 A | * | 3/1977 | Tokunaga | 269/61 |
| 4,301,671 A | * | 11/1981 | Payne et al. | 72/344 |
| 4,981,634 A | * | 1/1991 | Maus et al. | 264/102 |
| 5,205,027 A | * | 4/1993 | Watanabe et al. | 29/235 |
| 5,253,405 A | * | 10/1993 | Carroll | 29/213.1 |
| 5,551,143 A | * | 9/1996 | Saval et al. | 29/598 |
| 5,732,589 A | * | 3/1998 | McClellan et al. | 72/405.12 |
| 7,472,716 B2 | * | 1/2009 | Gethmann | 137/15.18 |
| 7,712,201 B2 | * | 5/2010 | Relan | 29/450 |
| 2012/0056382 A1 | * | 3/2012 | Gremilion et al. | 277/313 |
| 2013/0036586 A1 | * | 2/2013 | Nakamura et al. | 29/270 |

\* cited by examiner

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

An assembly apparatus includes a spline sleeve defining a central hole having an inner surface defining a plurality of first and second sliding grooves, a first connecting member and a second connecting member positioned on opposite ends of the spline sleeve, a sliding member sildably received in the spline sleeve and having at least one first key portion slidably received in the corresponding first sliding groove, a rotation member rotatable relative to the sliding member and including a plurality of second key portions selectively slidably engaged in the corresponding first sliding grooves and interfering with the corresponding second sliding grooves, a first elastic member abutting the first connecting member and the rotation member, a second elastic member abutting the second connecting member and the sliding member, and a knockout pin assembly fixed to the sliding member and slidable relative to the second connecting member.

13 Claims, 6 Drawing Sheets

ASSEMBLY APPARATUS

BACKGROUND

1. Technical Field

The present disclosure generally relates to assembly apparatuses and, more particularly to an assembly apparatus employing a knockout pin assembly.

2. Description of the Related Art

When mounting a hollow rubber plug into a threaded hole, a robot arm and a knockout pin assembly are commonly employed. During insertion, the knockout pin assembly fixes the rubber plug, and the robot arm moves and positions the knockout assembly to insert the rubber plug into the threaded hole. However, when the knockout pin assembly is retrieved, the rubber plug may be easily withdrawn from the threaded hole by the knockout pin assembly, and the process must be repeated, sometimes more than once, thus lowering efficiency.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure.

DETAILED DESCRIPTION

Figure 1:
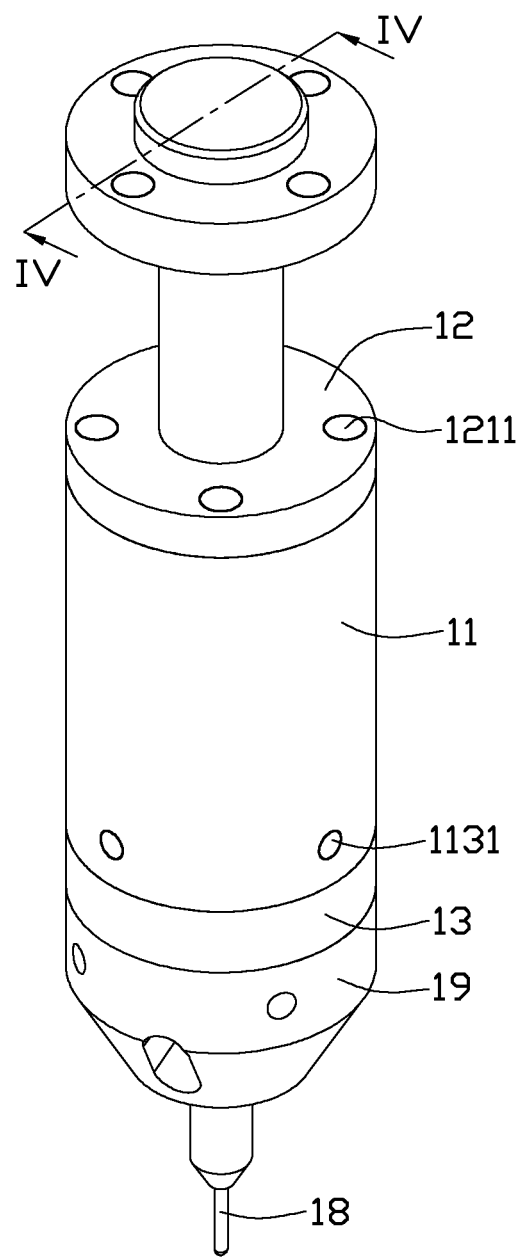
FIG. 1 is an assembled, isometric view of an embodiment of an assembly apparatus including a spline sleeve.
Figure 2:
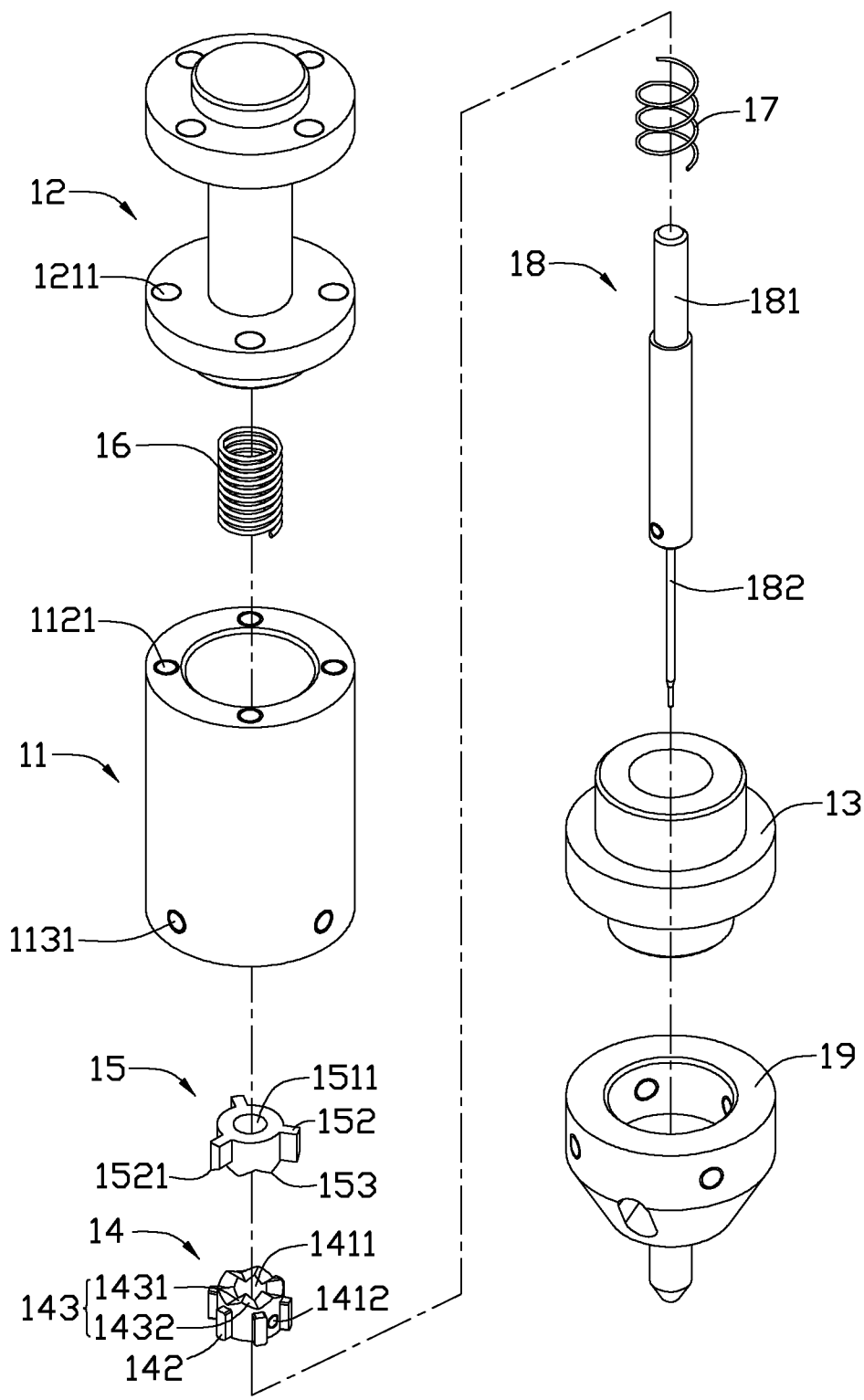
FIG. 2 is an exploded, isometric view of the assembly apparatus of FIG. 1.
Figure 3:
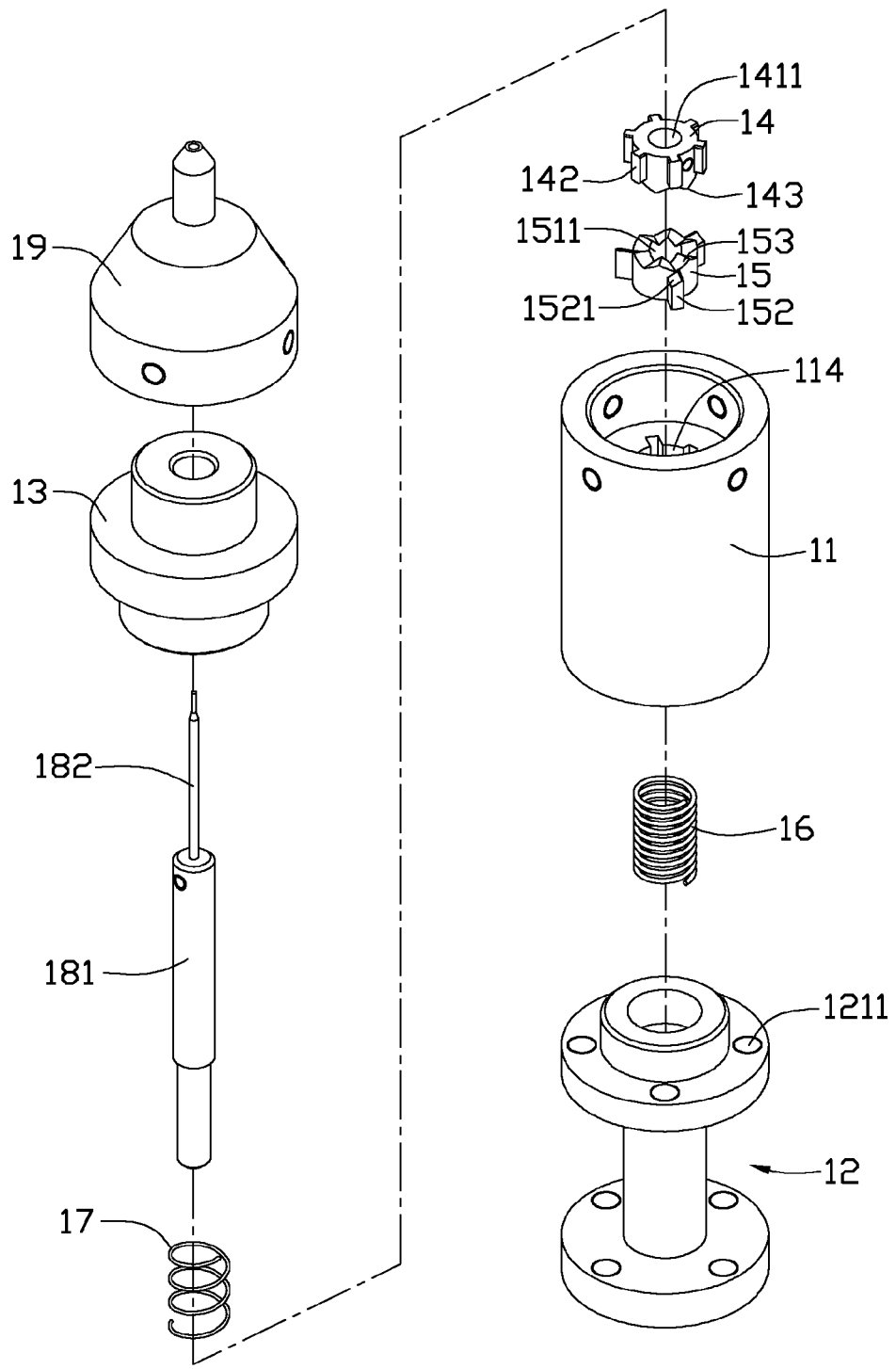
FIG. 3 is similar to FIG. 2, but viewed from another aspect.

Referring to FIGS. 1 through 3, one embodiment of an assembly apparatus 100 may be used to mount a hollow rubber plug into a threaded hole. The assembly apparatus 100 includes a spline sleeve 11, a first connecting member 12 and a second connecting member 13 positioned on opposite ends of the spline sleeve 11, a sliding member 14 slidably received in the spline sleeve 11, a rotation member 15 received in the spline sleeve 11 to clutch the sliding member 14, a first elastic member 16 between and abutting the first connecting member 12 and the rotation member 15, a second elastic member 17 between and abutting the second connecting member 13 and the sliding member 14, a knockout pin assembly 18 fixed to the sliding member 14 and slidable relative to the second connecting member 13, and a protective sleeve 19 fixed to the second connecting member 13 and sleeved on the knockout pin assembly 18. The distal end of the knockout pin assembly 18 catches the hollow rubber plug, and the first connecting member 12 is secured to a robot arm. The robot arm moves and positions the knockout pin assembly 18 to insert the rubber plug into the threaded hole.

Figure 4:
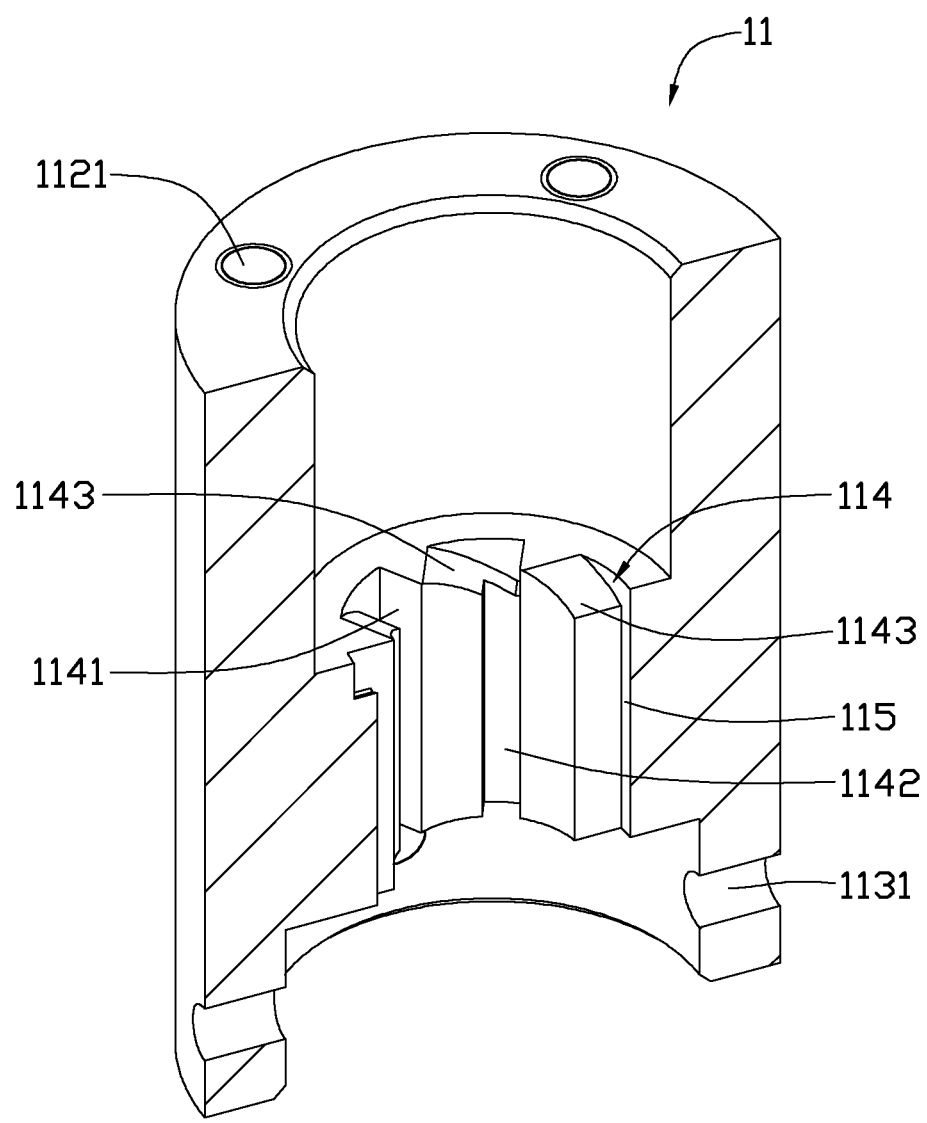
FIG. 4 is a cross-section of the spline sleeve of the assembly apparatus of FIG. 1.
Figure 5:
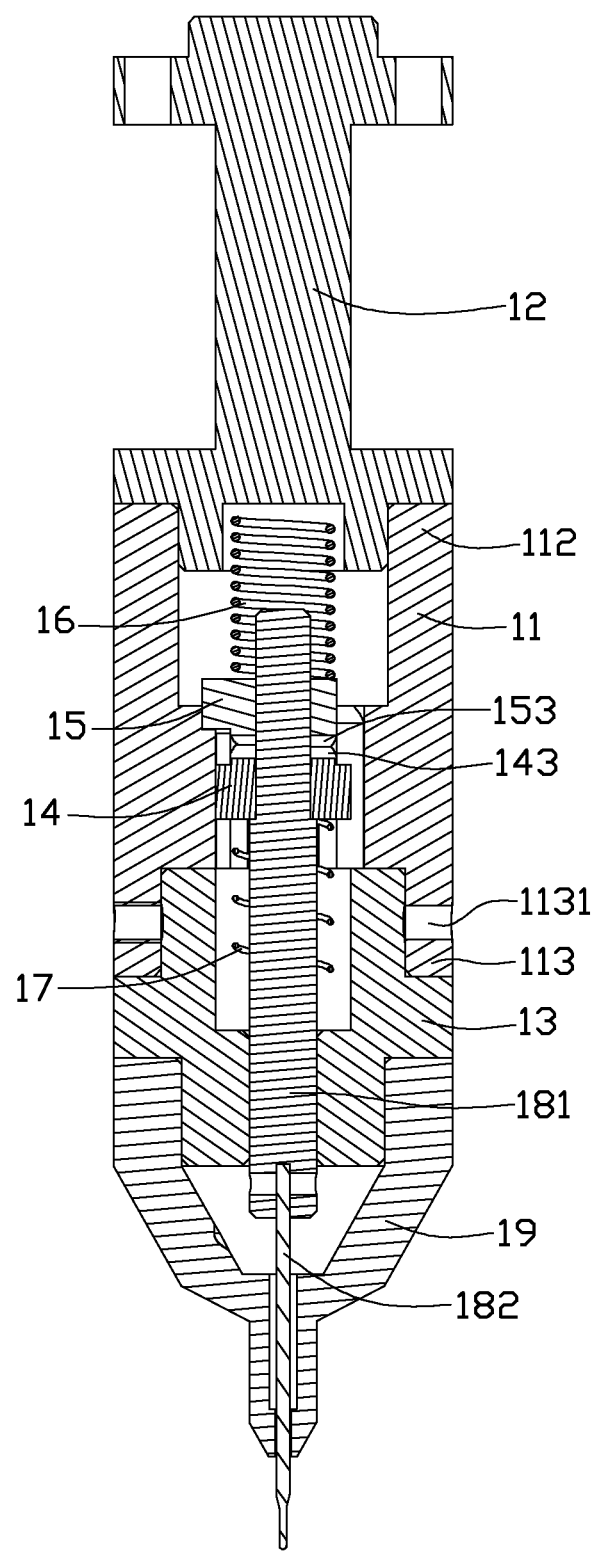
FIG. 5 is a cross section of the assembly apparatus of FIG. 1, taken along the line IV-IV.

Referring also to FIGS. 4 and 5, the spline sleeve 11 includes a first end 112 and a second end 113 opposite to the first end 112. The first end 112 is connected to the first connecting member 12, and the second end 113 is connected to the second connecting member 13. The end surface of the first end 112 defines a plurality of mounting holes 1121 extending axially. The first connecting member 12 defines a plurality of mounting holes 1211 corresponding to the mounting holes 1121 of the spline sleeve 11. The first connecting member 12 and the spline sleeve 11 are fixed together by a plurality of threaded members received in the mounting holes 1121, 1211. The second end 113 defines a plurality of mounting holes 1131 extending radially therethrough. A plurality of threaded members (not shown) is received in the mounting holes 1131 and contact the periphery of the second connecting member 13, thus securing the second connecting member 13 to the spline sleeve 11.

The spline sleeve 11 defines a central hole 114 therethrough having an inner surface 115. The inner surface 115 of the central hole defines three first sliding grooves 1141 and three second sliding grooves 1142. The first and second sliding grooves 1141, 1142 are alternately and evenly distributed along the circumference of the spline sleeve 11. That is, the central angles of an arc between the adjacent first sliding grooves 1141 and the adjacent second sliding grooves 1142 are about 120 degrees, and each first sliding groove 1141 is positioned between adjacent second sliding grooves 1142. The central angle of an arc between one first sliding groove 1141 and its adjacent second sliding groove 1142 is about 60 degrees. In the illustrated embodiment, the radial depth of each first sliding groove 1141 exceeds that of the second sliding groove 1142, and the width of each first sliding groove 1141 is substantially equal to that of each second sliding groove 1142.

The spline sleeve 11 further includes a plurality of angled guide surfaces 1143, each connecting a corresponding first sliding groove 1141 or a corresponding second sliding groove 1142. Each guide surface 1143 extends along the circumference of the spline sleeve 11 and toward the second end 113.

The sliding member 14 is substantially cylindrical and defines a central through hole 1411 extending axially and a mounting hole 1412 extending radially. In the illustrated embodiment, the sliding member 14 includes six first key portions 142 extending axially. The first key portions 142 correspond to the first sliding grooves 1141 and the second sliding grooves 1142 such that the first key portions 142 are axially slidable in the first and second sliding grooves 1141, 1142. The sliding member 14 defines six teeth 143 on the end surface facing the rotation member 15. These teeth 143 are evenly distributed along the circumference. Each tooth 143 is V-shaped and includes a first tooth surface 1431 and a second tooth surface 1432. The first and second tooth surfaces 1431, 1432 and the center axis of the sliding member 14 substantially intersect at a point.

The rotation member 15 is substantially cylindrical and defines a central hole 1511 extending axially therethrough. The rotation member 15 includes three second key portions 152 evenly distributed along the circumference. The width of each second key portion 152 is substantially equal to that of each second sliding groove 1142. The radial height of each second key portion 152 exceeds the depth of a corresponding second sliding groove 1142 and is less than the depth of a corresponding first sliding groove 1141 such that the second key portions 152 can slide in the first sliding groove 1141 and interfere with the second sliding groove 1142. Each second key portion 152 forms a plurality of angled surfaces 1521 on a bottom to contact the angled guide surfaces 1143.

In the illustrated embodiment, the rotation member 15 forms six second teeth 153 meshing with the first teeth 143 of the sliding member 14. The first and the second teeth 143, 152 are reversed.

In this embodiment, the first elastic member 16 and the second elastic member 17 are cylindrical helical springs, and the elasticity factor of the first elastic member 16 exceeds that of the second elastic member 17.

The knockout pin assembly 18 includes a connecting bar 181 on a distal end of which a pin 182 is fixed. The connecting bar 181 is received in the second connecting member 13, the second elastic member 17, the central hole 1411 of the sliding member 14, the central hole 1511 of the rotation member 15, and the first elastic member 16, and fixed with the sliding member 14. The pin 182 extends out of the protective sleeve 19 to secure the hollow rubber plug.

Figure 6:
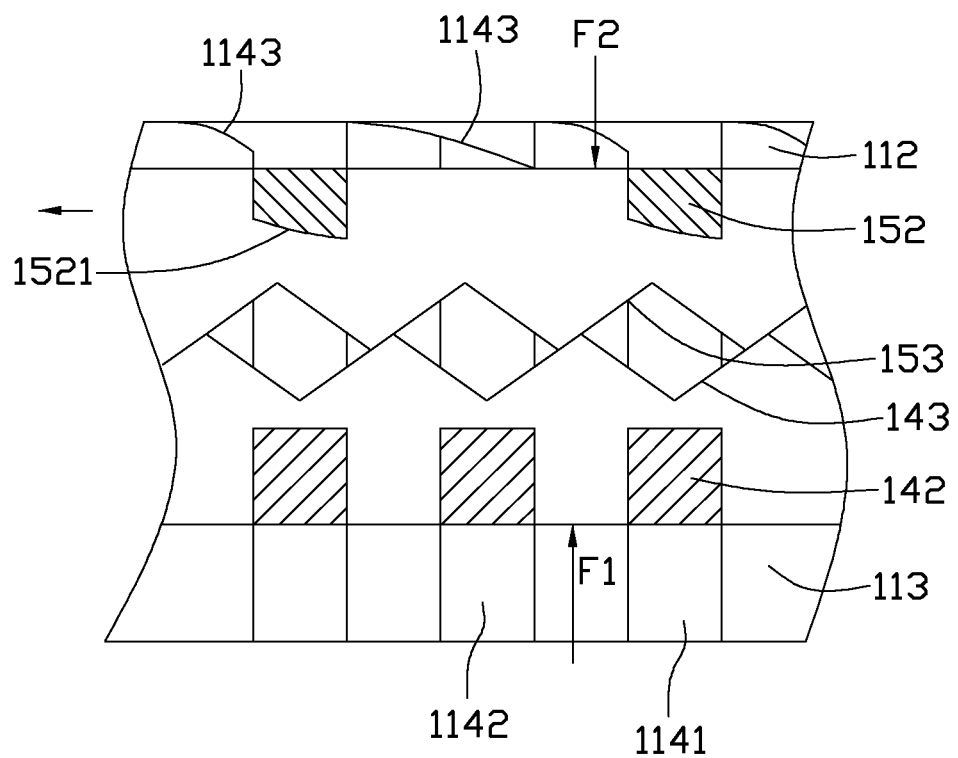
FIG. 6 is a partially expanded plan view of the assembly apparatus of FIG. 1 along a circumference thereof, shown in an initial state of the assembly apparatus.

In operation, as shown in FIG. 6, the assembly apparatus 100 is in an initial state, and the first key portions 142 and second key portions 152 are slidably received in the corresponding first sliding groove 1141, and a phase difference exists between the first tooth 143 and the second tooth 153 along the circumference. The phase difference is about 2 degrees to 10 degrees, and preferably about 5 degrees. Because the elasticity factor of the first elastic member 16 exceeds that of the second elastic member 17, when compressed identically, the axial force F1 of the first elastic member 16 exceeds the axial force F2 of the second elastic member 17, so that the sliding member 14 and the rotation member 15 are moved axially toward the second connecting member 13, and the pin 182 is moved outwardly to catch the hollow rubber plug. During the process of catching the hollow rubber plug, the pin 182 can be protected from damage because the second elastic member 17 can absorb the impact energy.

After the hollow rubber plug is caught by the pin 182, the assembly apparatus 100 is moved and positioned by the robot arm, thus aligning the hollow rubber plug with the threaded hole. Then, the assembly apparatus 100 is further moved to insert the hollow rubber plug into the threaded hole. During insertion, the pin 182, the sliding member 14, and the rotation member 15 slide away from the second connecting member 13 until reach a retrieved state by the cooperation action of a larger resistance and force applied by the first elastic member 16 and the second elastic member 17, and the hollow rubber plug is maintained in the threaded hole.

Because a phase difference exists between the first tooth 143 and the second tooth 153, when the rotation member 15 slides out of the first sliding groove 1141, the rotation member 15 is moved to engage with the adjacent second sliding groove 1141 along the circumference by the sliding member 14 as shown by the arrow in FIG. 6. The angled guide surfaces 1143 contact the angled surfaces 1521, thus the rotation member rotating about 30 degrees about its axis and resisting the spline sleeve 11. Accordingly, the sliding member 14 is moved axially by the cooperative action of second elastic member 17 and an external force applied on the pin 182. When the sliding member 14 rotates about 30 degrees, the first teeth 142 engage the second teeth 153, and the pin 182 is drawn back to the retrieved state.

When the hollow rubber plug is inserted into the threaded hole, the pin 182 is retrieved automatically, and the plug is maintained in the threaded hole, thus facilitating the following insertion process. By utilizing the assembly apparatus 100, the cycle time of the insertion of the plug is shorter, thereby achieving a higher efficiency because the sliding member 14 and the rotation member 15 can operate at a higher frequency.

It should be understood that the number of the first key portions 142 can vary, and is not limited to six, but can alternatively be one, two, or more. The second key portions 152 of the rotation member 15 can also vary, and are not limited to three, as long as the number of first and second teeth 143, 153 is double the number of second key portions 152.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An assembly apparatus comprising:
   a spline sleeve defining a central hole having an inner surface, the inner surface defining a plurality of first sliding grooves and a plurality of second sliding grooves, wherein the first and second sliding grooves extend axially and are alternately and evenly distributed along the circumference of the spline sleeve, and the number of first sliding grooves is equal to the number of second sliding grooves;
   a first connecting member and a second connecting member positioned on opposite ends of the spline sleeve;
   a sliding member sildably received in the spline sleeve and comprising at least one first key portion slidably engaged in a corresponding first sliding groove;
   a rotation member rotatable relative to the sliding member and comprising a plurality of second key portions selectively slidably engaged in the corresponding first sliding grooves and interfering with corresponding second sliding grooves;
   a first elastic member positioned between and abutting the first connecting member and the rotation member;
   a second elastic member positioned between and abutting the second connecting member and the sliding member; and
   a knockout pin assembly fixed to the sliding member and slidable relative to the second connecting member;
   wherein the rotation member forms a plurality of first teeth on an end surface, and the sliding member forms a plurality of second teeth engaging with the first teeth, when the second key portions slide out of the corresponding first sliding groove, a phase difference exists between the first teeth and the second teeth, such that the rotation member tends to rotate relative to the sliding member to interfere with the corresponding second sliding grooves, and the number of first teeth and second teeth is twice the number of the first and second sliding grooves.

2. The assembly apparatus of claim 1, wherein the spline sleeve defines a plurality of angled guide surfaces with each angled guide surface connecting one first sliding groove or one second sliding groove; when the rotation member is rotated, the rotation member slides along the plurality of angled guide surfaces to the corresponding first sliding grooves or the corresponding second sliding grooves.

3. The assembly apparatus of claim 2, wherein each second key portion forms an angled surface on an end surface adjacent to the sliding member to engage with the corresponding angled guide surface.

4. The assembly apparatus of claim 1, wherein the first and second elastic members are cylindrical helical springs, and the first elastic member capable of providing a stronger spring force than the second elastic member.

5. The assembly apparatus of claim 1, wherein the first and second teeth are evenly distributed along the circumference.

6. The assembly apparatus of claim 5, wherein each first tooth is V-shaped and comprises a first tooth surface and a second tooth surface, and the first and second tooth surfaces and a center axis of the sliding member substantially intersect at a point.

7. The assembly apparatus of claim 1, wherein a radial depth of each first sliding groove exceeds that of a second sliding groove, and a width of each first sliding groove is substantially equal to that of a second sliding groove.

8. The assembly apparatus of claim 1, wherein a radial height of each second key portion exceeds a depth of the corresponding second sliding groove and is less than the depth of the corresponding first sliding groove.

9. The assembly apparatus of claim 1, further comprising a protective sleeve fixed to the second connecting member and sleeved on the knockout pin assembly.

10. The assembly apparatus of claim 1, the knockout pin assembly comprises a connecting bar and a pin fixed on a distal end of the connecting bar, the connecting bar is slidably received in the second connecting member, the second elastic member, the sliding member, the rotation member, and the first elastic member, and fixed with the sliding member.

11. The assembly apparatus of claim 1, wherein the phase difference is in a range from about 2 degrees to about 10 degrees.

12. The assembly apparatus of claim 1, wherein the phase difference is about 5 degrees.

13. The assembly apparatus of claim 1, wherein one end of the spline sleeve defines a plurality of mounting holes extending radially therethrough, and the assembly apparatus further comprises a plurality of threaded members received in the mounting holes and contacting a periphery of the second connecting member.

* * * * *